United States Patent
Burks et al.

(10) Patent No.: US 12,487,997 B1
(45) Date of Patent: Dec. 2, 2025

(54) SYSTEM AND METHOD FOR MODELING A SEARCH QUERY

(71) Applicant: United Services Automobile Association, San Antonio, TX (US)

(72) Inventors: Rickey Dale Burks, Boerne, TX (US); Michael P. Bueche, Jr., San Antonio, TX (US); Thomas Niles, San Antonio, TX (US); Charles L. Oakes, III, Boerne, TX (US)

(73) Assignee: United Services Automobile Association, San Antonio, TX (US)

( * ) Notice: Subject to any disclaimer, the term of this patent is extended or adjusted under 35 U.S.C. 154(b) by 0 days.

(21) Appl. No.: 18/237,642

(22) Filed: Aug. 24, 2023

Related U.S. Application Data

(63) Continuation of application No. 17/094,386, filed on Nov. 10, 2020, now Pat. No. 11,775,510, which is a continuation of application No. 15/465,309, filed on Mar. 21, 2017, now Pat. No. 10,866,951, which is a continuation of application No. 14/139,335, filed on Dec. 23, 2013, now Pat. No. 9,633,071.

(60) Provisional application No. 61/745,983, filed on Dec. 26, 2012.

(51) Int. Cl.
G06F 16/24 (2019.01)
G06F 16/242 (2019.01)
G06F 16/248 (2019.01)

(52) U.S. Cl.
CPC .......... *G06F 16/243* (2019.01); *G06F 16/248* (2019.01)

(58) Field of Classification Search
CPC ............................ G06F 16/243; G06F 16/248
See application file for complete search history.

(56) References Cited

U.S. PATENT DOCUMENTS

| 8,412,693 | B2 | 4/2013 | Cox et al. |
| 2004/0064351 | A1 | 4/2004 | Mikurak |
| 2012/0109708 | A1* | 5/2012 | Mueller ............. G06Q 10/0633 705/7.27 |

* cited by examiner

*Primary Examiner* — Truong V Vo
(74) *Attorney, Agent, or Firm* — Plumsea Law Group, LLC

(57) ABSTRACT

A computer method and system for providing information results in response to a natural language information request. The system and method include receiving a natural language information request from a user and compiling a computer executable query from the natural language information request from a user wherein the query is formatted to extract data from one or more computer databases. The query is then presented to the user prior to execution of the query so as to enable the user to change the query prior to its execution. The query is then executed to extract data from one or more computer databases whereby extracted data is presented to the user in a certain presentation format.

20 Claims, 5 Drawing Sheets

SYSTEM AND METHOD FOR MODELING A SEARCH QUERY

CROSS REFERENCE TO RELATED APPLICATIONS

This application is a Continuation of U.S. patent application Ser. No. 17/094,386 filed Nov. 10, 2020, which is a Continuation of U.S. patent application Ser. No. 15/465,309 filed Mar. 21, 2017, which is a Continuation of U.S. patent application Ser. No. 14/139,335 filed Dec. 23, 2013, which claims priority to U.S. Provisional Patent Application No. 61/745,983 filed Dec. 26, 2012, which are incorporated herein by reference in their entirety.

FIELD OF THE INVENTION

The present invention relates generally to a natural language query system for processing voice. More specifically, the present invention relates to a natural language query system for modeling a query.

BACKGROUND OF THE INVENTION

The use of personal computers (PCs), personal digital assistants (PDAs). Web-enabled phones, smart phones, tablet devices, wire line and wireless networks, the Internet, Web-based query systems and engines, and the like has gained relatively widespread acceptance in recent years. This is due, in large part, to the relatively widespread availability of high-speed, broadband Internet access through digital subscriber lines (DSLs) (including asymmetric digital subscriber lines (ADSLs) and very-high-bit-rate digital subscriber lines (VDSLs)), cable modems, satellite modems, wireless local area networks (WLANs), 3G/4G wireless systems, and the like. Thus far, user interaction with PCs, PDAs, smart phones, tablet devices. Web-enabled phones, wireline and wireless networks, the Internet. Web-based query systems and engines, and the like has been primarily non-voice-based, through keyboards, mice, intelligent electronic pads, monitors, touch screens, printers, and the like. This has limited the adoption and use of these devices and systems somewhat, and it has long been felt that allowing for accurate, precise, and reliable voice-based user interaction, mimicking normal human interaction, would be advantageous. For example, allowing for accurate, precise, and reliable voice-based user interaction would certainly draw more users to e-commerce, e-support, e-learning, etc., and reduce learning curves.

In this context, "mimicking normal human interaction" means that a user would be able to speak a question into a Web-enabled device or the like and the Web-enabled device or the like would respond quickly with an appropriate answer or response, through text, graphics, or synthesized speech, the Web-enabled device or the like not simply converting the user's question into text and performing a routine search, but truly understanding and modeling the user's question.

Several products and services currently allow for limited voice-based user interaction with PCs. PDAs, and the like. Such software products include, for example, Dragon NaturallySpeaking™ by Scansoft, Inc. and SIRI™ by Apple. These products, however, which allow a user to perform dictation, voice-based command-and-control functions are often inaccurate, imprecise, and unreliable.

Existing systems, apparatuses, software products, and methods for providing natural language query services suffer from at least one of the following shortcomings. They often require time-consuming, and often inaccurate, imprecise, unreliable, and require voice training.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a computer method and system for providing information results in response to a natural language information request is described in which a natural language information request is received from a user and a computer executable query is compiled from the natural language information request wherein the query is formatted to extract data from one or more computer databases. The query is then presented to the user prior to execution of the query so as to enable the user to change the query prior to its execution. The query is then executed to extract data from one or more computer databases whereby extracted data is presented to the user in a certain presentation format.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
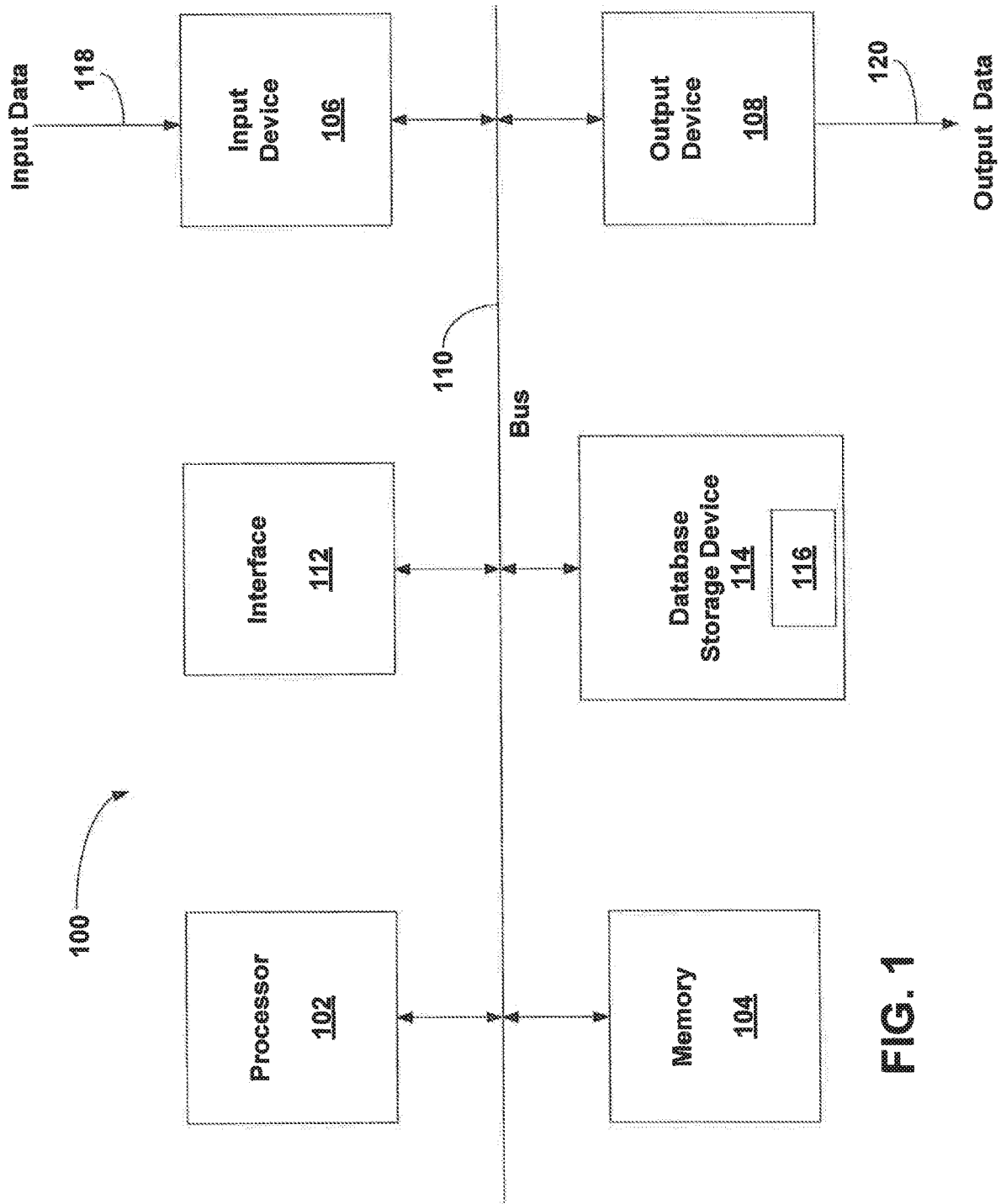
FIG. 1 depicts a system overview and data-flow in an illustrative embodiment of system operation.

The present invention is now described more fully with reference to the accompanying drawings, in which an illustrated embodiment of the present invention is shown. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention. Also, the flow charts and methods described herein do not imply either required steps or a required order to the steps, and the illustrated embodiments and processes may be implemented in any order and/or combination that is practicable.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

Turning now descriptively to the drawings, in which similar reference characters denote similar elements throughout the several views, FIG. 1 depicts an exemplary general-purpose computing system in which illustrated embodiments of the present invention may be implemented.

A generalized computering embodiment in which the present invention can be realized is depicted in FIG. 1 illustrating a processing system 100 which generally comprises at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could comprise more than one distinct processing device, for example to handle different functions within the processing system 100. Input device 106 receives input data 118 and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, at least one database 116. The interface 112 may allow wired and/or wireless communication between the processing unit 102 and peripheral components that may serve a specialized purpose. Preferably, the processor 102 receives instructions as input data 118 via input device 106 and can display processed results or other output to a user by utilizing output device 108. More than one input device 106 and/or output device 108 can be provided. It should be appreciated that the processing system 100 may be any form of terminal, server, specialized hardware, or the like.

It is to be appreciated that the processing system 100 may be a part of a networked communications system. Processing system 100 could connect to a network, for example the Internet or a WAN. Input data 118 and output data 120 could be communicated to other devices via the network. The transfer of information and/or data over the network can be achieved using wired communications means or wireless communications means. A server can facilitate the transfer of data between the network and one or more databases. A server and one or more databases provide an example of an information source.

Thus, the processing computing system environment 100 illustrated in FIG. 1 may operate in a networked environment using logical connections to one or more remote computers. The remote computer may be a personal computer, a server, a router, a network PC, a peer device, or other common network node, and typically includes many or all of the elements described above.

It is to be further appreciated that the logical connections depicted in FIG. 1 include a local area network (LAN) and a wide area network (WAN), but may also include other networks such as a personal area network (PAN). Such networking environments are commonplace in offices, enterprise-wide computer networks, intranets, and the Internet. For instance, when used in a LAN networking environment, the computing system environment 100 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 100, or portions thereof, may be stored in a remote memory storage device. It is to be appreciated that the illustrated network connections of FIG.

1 are exemplary and other means of establishing a communications link between multiple computers may be used.

FIG. 1 is intended to provide a brief, general description of an illustrative and/or suitable exemplary environment in which embodiments of the below described present invention may be implemented. FIG. 1 is an example of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing system environment 100 of FIG. 1. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, tablet devices, smart phone devices, multiprocessor systems, microprocessor-based systems, set top boxes, programmable consumer electronics, network, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

With the exemplary computing system environment 100 of FIG. 1 being generally shown and discussed above, FIG. 2 illustrates process flows in accordance with certain embodiments (which is to be understood to incorporate system 302, or components thereof). In general, the natural language query system and method in accordance with the illustrative embodiments described herein may incorporate and combine the following technologies:

Speech Processing

Speech processing allows PCs, PDAs, Web-enabled phones, smart phones, tablet devices, and the like to recognize—and, to some extent, understand—spoken language. Spoken language is "eyes free" and "hands free", allowing a PC, PDA, Web-enabled phone, smart phone, tablet device, or the like to be used anywhere. This technology has engendered two types of software products: continuous-speech recognition software products and command-and-control software products. Because a context-free grammar allows a speech recognition engine to reduce recognized words to those contained in a predetermined list, high degrees of speech recognition may be achieved in a speaker-independent environment. A context-free grammar may be used with relatively inexpensive microphones, limited central processing units (CPUs), and no time-consuming, and often inaccurate, imprecise, and unreliable, voice training. Although speech processing technology is not new, speech recognition accuracy rates are just now becoming acceptable for natural language discourse.

Speech Synthesis

Speech Synthesis provides the ability to mimic speech which is particularly useful for applications that require spontaneous user interaction, or in situations where viewing or reading are impractical, such as, for example, when a PC, PDA, Web-enabled phone, smart phone, tablet device, or the like provide driving directions or instructions to the driver of a vehicle. In software products aimed at the average user, it is important that output sounds are pleasant and sound human enough to encourage regular use. Several software products now bring relatively inexpensive and effective conversational access to information applications and accelerate the acceptance of speech as a user interface alternative for Web-based and mobile applications, including, for example, Microsoft Speech Server by Microsoft Corp. Microsoft Speech Server currently supports numerous languages and is based on the open-standard Speech Application Language Tags (SALT) specification, which extends familiar mark-up languages and leverages the existing Web-development paradigm.

Natural Language Processing (NLP) Systems

NLP systems interpret written, rather than spoken, language and may be found in speech processing systems that begin by converting spoken input into text. Using lexicons and grammar rules, NLP parses sentences, determines underlying meanings, and retrieves or constructs responses. NLP technology's main use is in enabling databases to answer queries presented in the form of questions. Another use is in handling high-volume email. NLP performance may be improved by incorporating a common sense knowledge base—that is, a set of real-world rules. Almost all of the database query languages tend to be rigid and difficult to learn, and it is often difficult for even the most experienced user to get desired information out of a database. A natural language interface to the SQL language overcomes the need for users to master the complexities of the SQL language.

It is noted certain features provided by the embodiments illustrated herein include (and are not limited to) modeling a user's spoken request, preferably with input from the requester prior to submission for execution of the request to ensure accuracy. In particular, a requester preferably confirms a query is presented (modeled) in a proper context. Over the passage of time and usage, a "learning engine" is able to adaptively model queries for providing more accurate queries, and thus results. Other features include providing access to certain databases for providing results based upon information relating to a user's "standing" (e.g., is the user a client, employee, executive staff, have proper security access authorizations, etc.).

Figure 2:
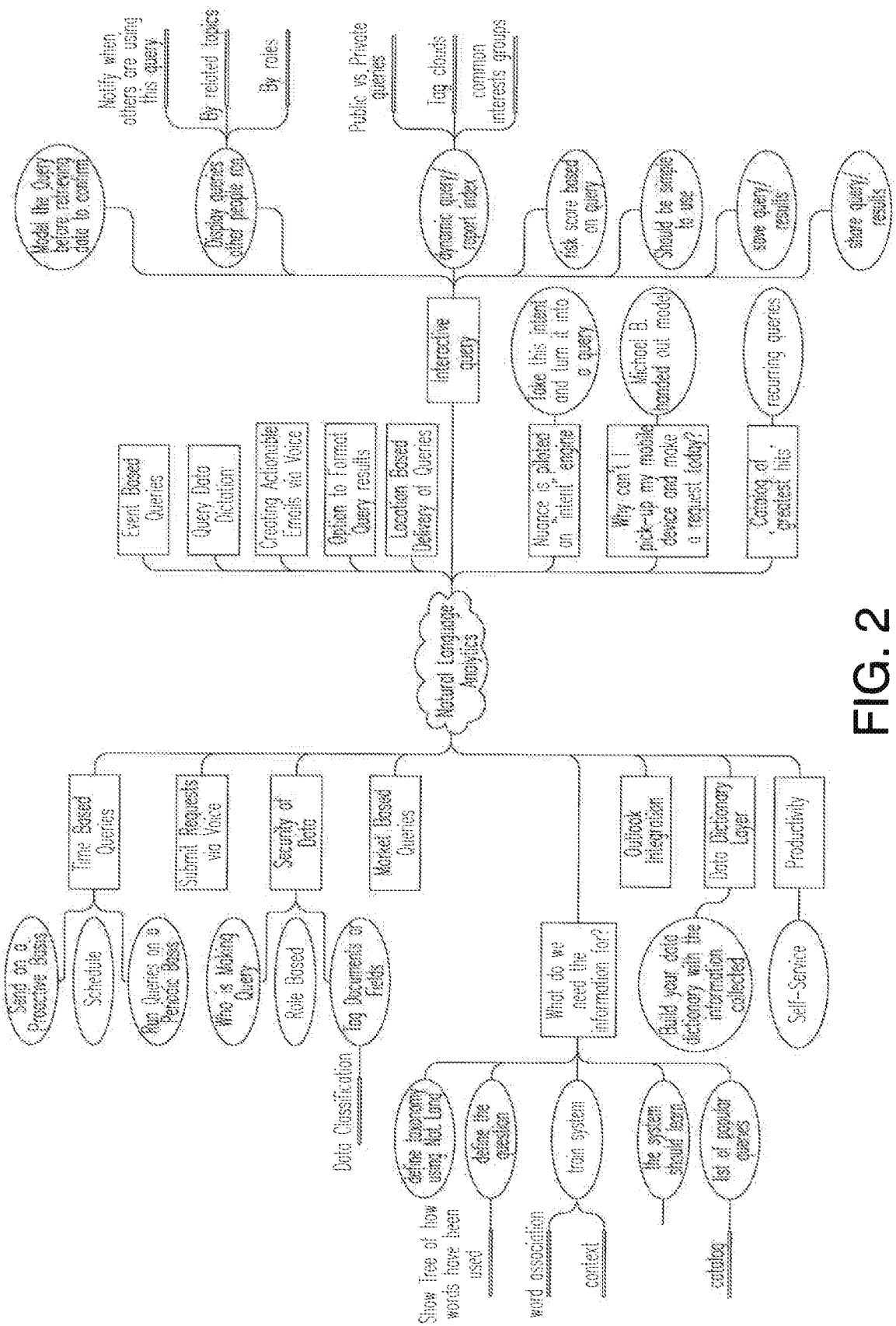
FIG. 2 depicts process flows in accordance with certain illustrative embodiments.
Figure 3:
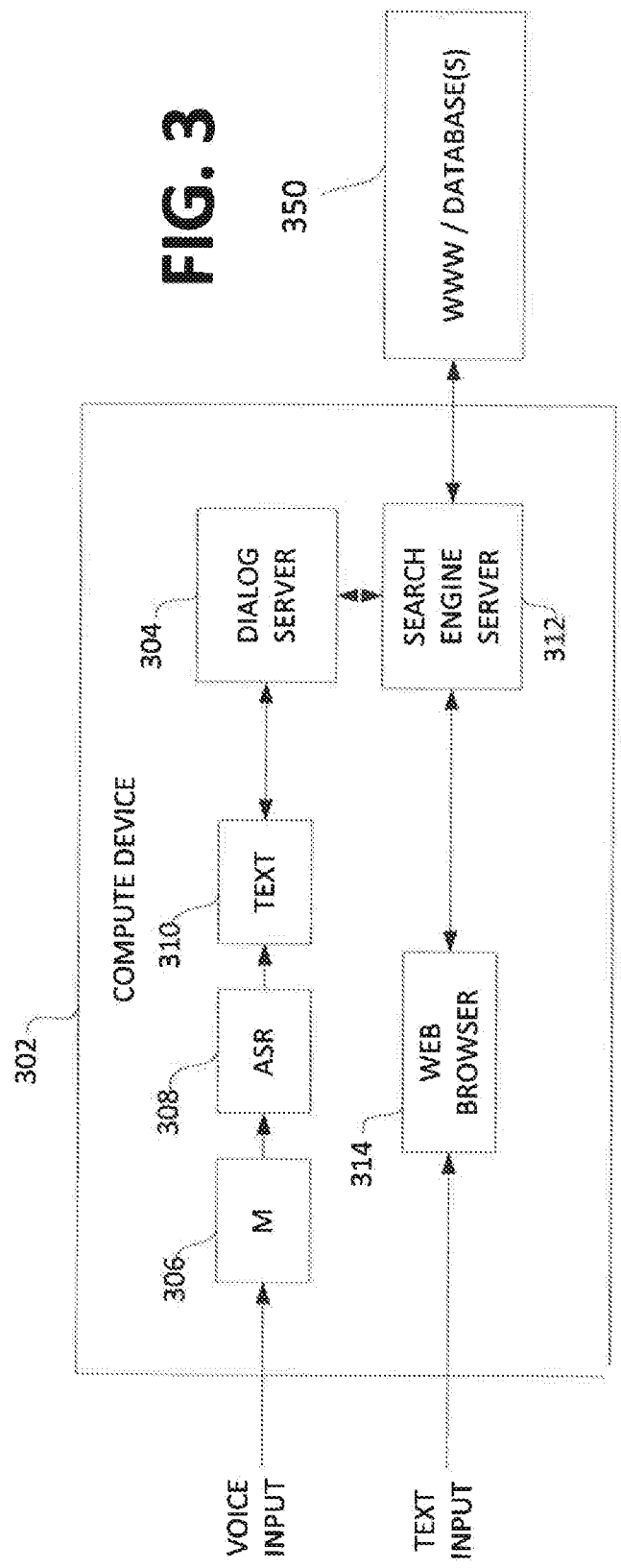
FIG. 3 depicts an illustrative system architecture according to an embodiment of the present invention.

It is to be understood the certain illustrated embodiments disclose a method and system which utilize a modeling engine with natural analytics to: 1) intelligently determine (and predict) a spoken user query; and 2) determine user query results (and security access level authorization) at least contingent one or more of the following:

- User ID and/or enterprise standing (obtained via a plurality of ways (e.g., cell phone no, device ID, IP address, GPS, biometric analysis and the like))
- Location based query (e.g., did query originate from a "help-line")
- Predetermined user rights (e.g., individual and/or group based)
- Predictive user behavior based on user query precedent
- Event and/or time based queries
- Formatting and/or using heat maps for data requests With a discussion of FIGS. 1 and 2 being provided above, discussion will now turn to FIG. 3 (which incorporates system 100, or components thereof) which illustrates an exemplary architecture for the invention. As noted above, it is to be appreciated the present invention relates to systems, methods and computer-readable media for providing a natural language dialog to a database such as the WWW, a corporate database, a private database or any other database. As can be appreciated, a benefit of the invention will be to model accurate/intelligent queries which may provide results target to a certain user class/category. For instance, a search query that is common for two user's (e.g., provide corporate financial reports for the 4th quarter for Acme Inc.) may provide differing results since one user (e.g., Acme CEO) may have access to more data than the other user (e.g., an Acme shareholder). The computing devices and servers shown may include such known hardware components as described above with reference to FIG. 1, such as a central processor, a bus connecting various hardware components, memory, storage means such as a hard disk, random access memory, means for communicating and networking with other computers, and so forth. These components, improvements and variations thereof based on different devices are known to those of skill in the art.

As shown in FIG. 3, a computing device 302 enables a user to interact with the device 302 as well as other databases such as the WWW 350. The computing device 302 may be, for example, a server, a desktop, laptop computer or another type of suitable computing device. There is no restriction on the particular configuration of the computing device hardware or the particular means with which it communicates with other computing devices for searching the WWW or any other database. The computing device 302 preferably runs software that provides a user interface for interacting with the device. In one example, the client software is a browser 314 such as Internet Explorer® or Mozilla® wherein a user can direct the browser to a search engine website such as Google. For instance, the search engine server 312 may serve a webpage to the user on the compute device 302 and when the user inputs a text search from which a search query is modeled as described below, the server 312 uses an algorithm to search webpages and/or data files from databases and presents results to a user.

It is to be appreciated the certain embodiments illustrated herein provides for a natural language dialog approach to modeling a search query for searching one or more databases. In one aspect of the invention, the computing device includes a microphone 306 for receiving voice input from the user. An automatic speech recognition (ASR) engine or module 308 converts the speech into text 310. While the ASR engine is shown as part of the computing device 302, there is no restriction on where any particular hardware or software component resides. For example, the microphone may be separate from the computing device 302 and the ASR module may run on the dialog server 304 instead of the compute device 302. Those of skill in the art will understand the variations that are possible and contemplated while maintaining the core principles of the invention. It is preferably that a large vocabulary speech recognizer be used as the front-end to the user's request.

Figure 4:
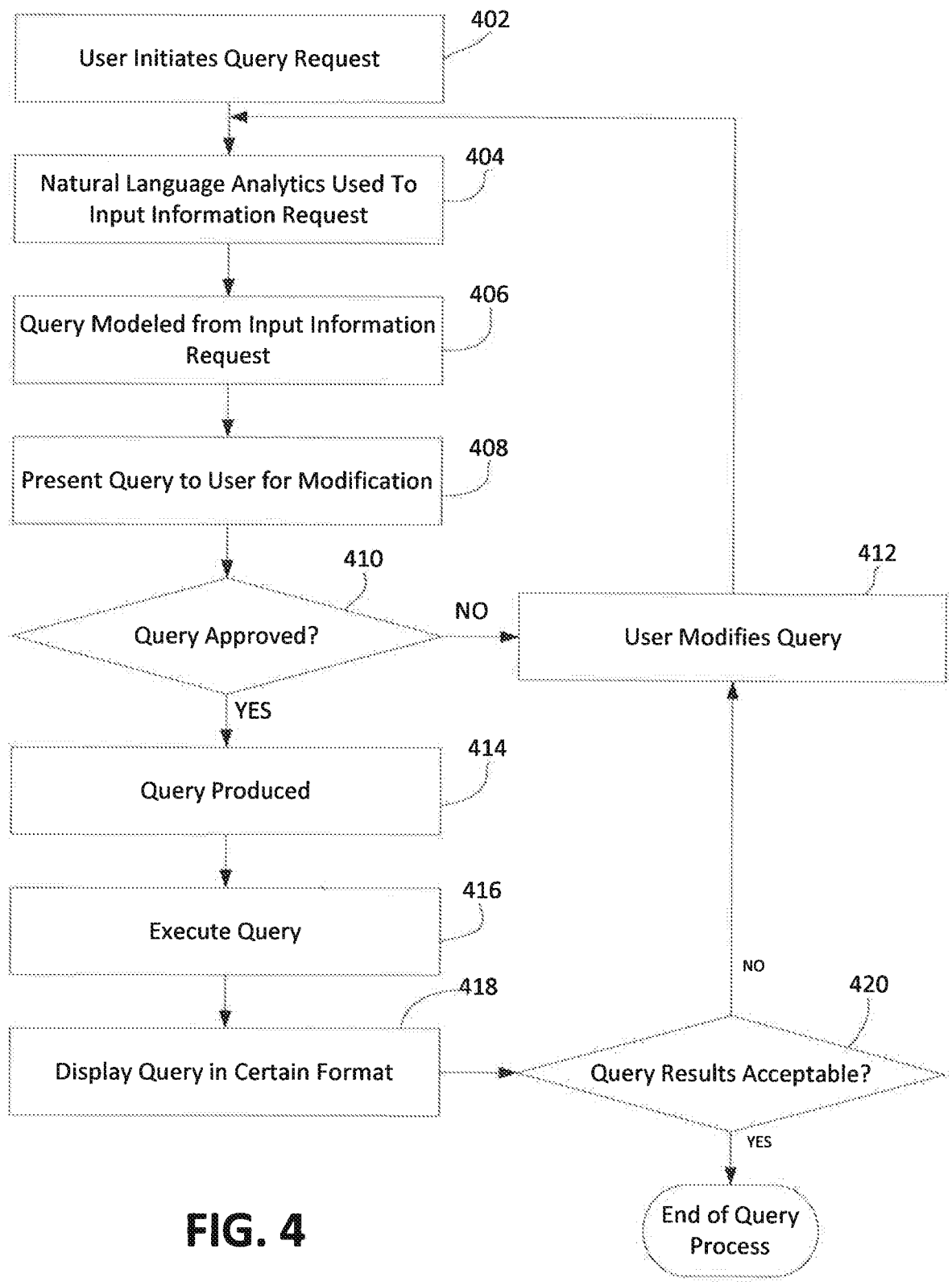
FIG. 4 depicts a method in accordance with an illustrative embodiment of the present invention.

The text is preferably transmitted to a dialog server 304 that extracts key data from the user query. Various modules may be programmed to perform the steps set forth herein for practicing the invention. Those of skill in the art will understand the programming language and means for creating these various modules. Reference is now also made to FIG. 4 as the steps of the method embodiment of the invention are discussed. It is noted that the order of steps shown in FIG. 4 is not required, so in principle, the various steps may be performed out of the illustrated order. Also certain steps may be skipped, different steps may be added or substituted, or selected steps or groups of steps may be performed in a separate application following the embodiments described herein.

Starting at step 402, a user initiates a query request for information results which can be achieved via a user computing device (e.g., desktop, laptop, tablet device, smart phone device and the like) coupled via a network to compute device 302. The user's request for information results is provided via a natural language information request, preferably spoken into the user's aforesaid computing device (step 404). It is noted the user's request for information results may include a request to present extracted information in a predefined format such as a graphics based presentation (e.g., graphs, pie charts, etc) and/or a text based presentation (ASCII) (e.g., textual presentations, tables, spreadsheets, etc.).

This natural language information request is then transmitted to computing device 302 (via known networking methods and systems), which compute device 302 is configured and operational to compile a computer executable search query from the user's aforesaid natural language information request, which search query is formatted to extract data from one or more databases 350 (step 406). The compute device 302 may be configured and operational to learn (via analytical analysis), and retain in memory 104, the habits, trends and definitions for compiling a computer executable query based from user natural language input, which are then utilized by compute device 302 for compiling the present computer executable query. It is to be appreciated the aforesaid learned habits, trends and definitions for compiling a computer executable query may be associated with the present user and/or associated with one or more different users.

Figure 5:
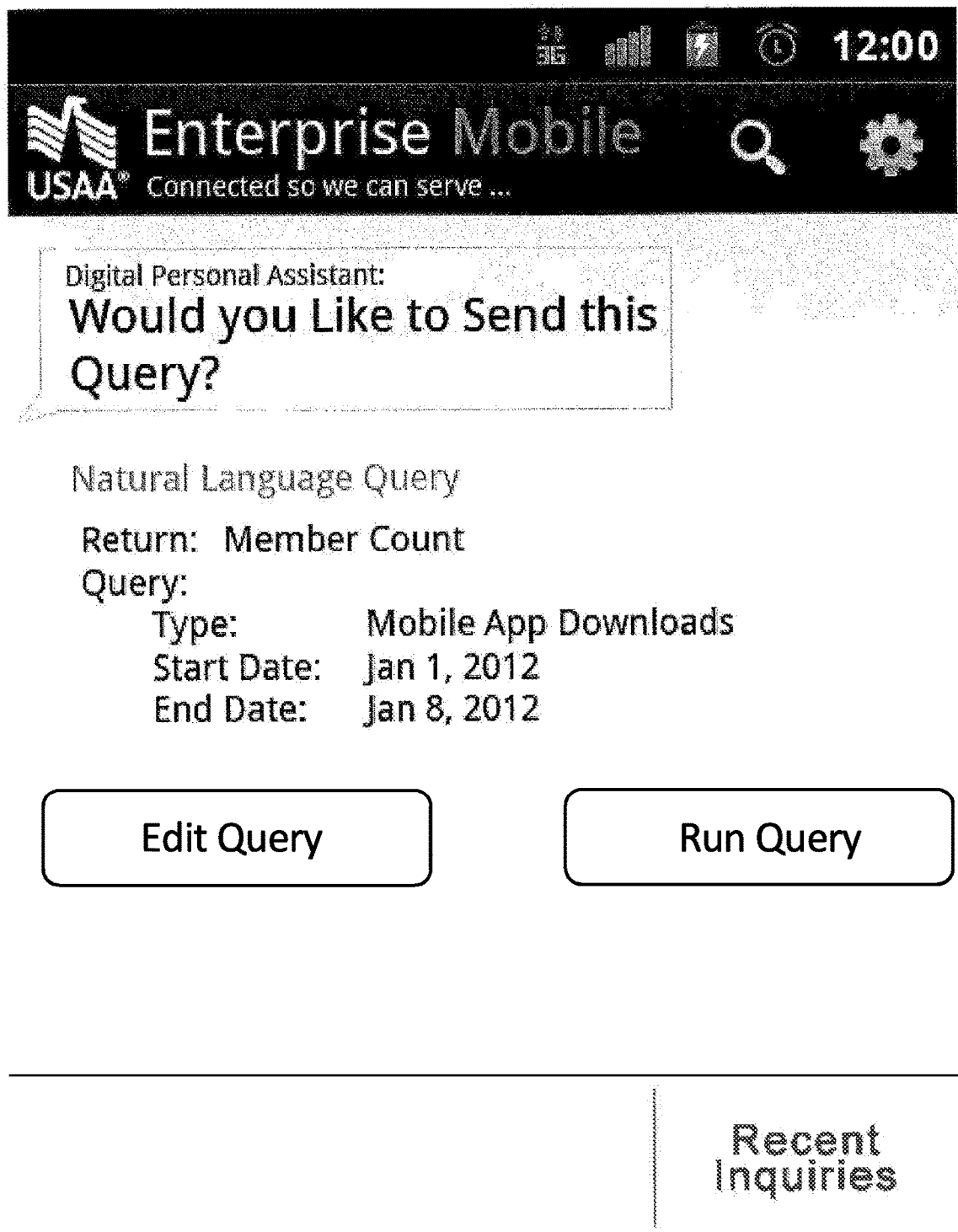
FIG. 5 depicts an illustrative screen shot from a user's device indicating the opportunity to modify a computer compiled query.

Next, and with reference to FIG. 5, prior to computer execution of the compiled search query, compute device 302 presents the modeled search query to the user, preferably via a display provided on the user's computing device to enable the user to determine if the modeled query is acceptable (step 408). It is to be appreciated the modeled search query may be presented to the user in numerous formats understandable by the user including in a natural language format, textual format, Boolean string format, and the like. Next, the user indicates whether the modeled query is acceptable, preferably via input with the user's computing device (step 410). If the modeled query is not acceptable, the user then modifies the modeled query, via preferably input to user's computing device (step 412), whereafter process is returned to step 404. It is to be appreciated a user may change a query through using any know means, including, but not limited to natural language input, gesture input, keyboard, etc.

If the modeled query is acceptable (step 410), the query is then formatted for computer execution (e.g., transformed into a Boolean search string or any other format suitable for computer interpolation) (step 414) whereafter the query is executed by compute device 302 to extract information results from various databases (e.g., public, private, WWW, etc.) (step 416). The compute device is preferably configured and operational to retrieve information results from one or more databases contingent upon the user's identity. For instance, if the user is identified as a CEO of Acme Inc. that user will have access to more data than would a user who is only identified as a shareholder of Acme Inc. The compute device 302 may determine the user's identity for instance from one or more of the following: user biometrics; identification of user's cellular phone; user's IP address; and GPS coordinates associated with user and any other attributes that may be used by the compute device 302 to identify the user.

The results of the query are then provided to the user, preferably via the user's computing device (e.g., display), and preferably in a predefined format if requested by the user (step 418). The user then reviews the query results to determine if they are acceptable (step 420), which includes whether the content of the results are acceptable and/or if the format for how the results are presented is acceptable (step 420). If no, then process returns to step 412 wherein the user is able to modify the modeled query to retrieve different results and/or have the results presented in a different presentation format.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

The above presents a description of a best mode contemplated for carrying out the present invention and of the manner and process of making and using it in such full, clear, concise, and exact terms as to enable any person skilled in the art to which it pertains to make and use these devices and methods. The present invention is, however, susceptible to modifications and alternative method steps from those discussed above that are fully equivalent. Consequently, the present invention is not limited to the particular embodiments disclosed. On the contrary, the present invention encompasses all modifications and alternative constructions and methods coming within the spirit and scope of the present invention.

What is claimed is:

1. A computer implemented method for providing information results in response to a natural language information request comprising:

receiving, from a user's device having an associated device identification (ID), a natural language information request from a user associated with the user's device ID;

compiling a computer executable query from the natural language information request from a user wherein the query is formatted to extract data from one or more computer databases;

determining an enterprise standing of the user associated with the user's device ID;

determining access to one or more computer databases based upon the determined enterprise standing of the user;

executing the query to extract data from the one or more computer databases, wherein data extracted from the one or more computer databases is contingent upon the user device ID and the enterprise standing of the user associated with the user device ID; and presenting, on the user's device, the extracted data.

2. The computer implemented method as recited in claim 1, wherein the extracted data is presented to the user in a predefined format wherein the predefined format is conditional upon predictive user behavior determined by prior user query precedent.

3. The computer implemented method as recited in claim 1, further including:

presenting the query to the user prior to execution of said query; and enabling a user to change the query prior to its execution.

4. The computer implemented method as recited in claim 1, wherein the received natural language information request includes a request to present extracted data in a predefined format.

5. The computer implemented method as recited in claim 4, wherein the predefined format includes a graphics based presentation.

6. The computer implemented method as recited in claim 4, wherein the predefined format includes an ASCII based presentation.

7. The computer implemented method as recited in claim 1, wherein receiving a natural language information request includes receiving a natural language query request from a user.

8. The computer implemented method as recited in claim 1, further including retaining in computer memory learned habits, trends and definitions for compiling prior queries.

9. The computer implemented method as recited in claim 8, wherein the retained learned habits, trends and definitions for prior compiled queries are utilized for compiling the computer executable query.

10. The computer implemented method as recited in claim 1, wherein the learned habits, trends and definitions for compiling prior queries are associated with the user.

11. A computer system for retrieving data from a natural language request, comprising:

a memory configured to store instructions;

a processor disposed in communication with said memory, wherein the processor upon execution of the instructions is configured to:

receive, from a user's device having an associated device identification (ID), a natural language information request from a user associated with the user's device ID;

compile a computer executable query from the natural language information request from a user wherein the query is formatted to extract data from one or more computer databases;

determine an enterprise standing of the user associated with the user's device ID;

determine access to one or more computer databases based upon the determined enterprise standing of the user;

execute the query to extract data from the one or more computer databases, wherein data extracted from the one or more computer databases is contingent upon the user device ID and the enterprise standing of the user associated with the user device ID; and present, on the user's device, the extracted data.

12. The computer system as recited in claim 11, wherein the extracted data is presented to the user in a predefined format wherein the predefined format is conditional upon predictive user behavior determined by prior user query precedent.

13. The computer system as recited in claim 11, wherein the processor is further configured to:

present the query to the user prior to execution of said query; and enable a user to change the query prior to its execution.

14. The computer system as recited in claim 11, wherein the received natural language information request includes a request to present extracted data in a predefined format.

15. The computer system as recited in claim 14, wherein the predefined format includes a graphics based presentation.

16. The computer system as recited in claim 14, wherein the predefined format includes an ASCII based presentation.

17. The computer system as recited in claim 11, wherein receiving a natural language information request includes receiving a natural language query request from a user.

18. The computer system as recited in claim 11, wherein the processor is further configured to retain in computer memory learned habits, trends and definitions for compiling prior queries.

19. The computer system as recited in claim 18, wherein the retained learned habits, trends and definitions for prior compiled queries are utilized for compiling the computer executable query.

20. The computer system as recited in claim 18, wherein the learned habits, trends and definitions for compiling prior queries are associated with the user.

* * * * *